United States Patent
Scherrer

(10) Patent No.: US 6,504,579 B1
(45) Date of Patent: Jan. 7, 2003

(54) ADAPTIVE FILTER FOR PROCESSING VIDEO SIGNALS

(75) Inventor: Remy Scherrer, Huningue (FR)

(73) Assignee: Micronas Intermettal GmbH, Freiburg (DE)

( * ) Notice: Subject to any disclaimer, the term of this patent is extended or adjusted under 35 U.S.C. 154(b) by 0 days.

(21) Appl. No.: 09/127,750

(22) Filed: Aug. 3, 1998

(30) Foreign Application Priority Data

Aug. 5, 1997 (EP) ............................................. 97113484

(51) Int. Cl.$^7$ ............................ H04N 9/78; H04N 5/213
(52) U.S. Cl. ......................... 348/667; 348/663; 348/624
(58) Field of Search ........................ 348/107, 667–669, 348/624, 665, 663; 708/301, 322; 382/261

(56) References Cited

U.S. PATENT DOCUMENTS

| | | | | |
|---|---|---|---|---|
| 4,937,667 A | * | 6/1990 | Choquet et al. | ............. 358/140 |
| 5,014,232 A | * | 5/1991 | Adré | ................... 364/724.19 |
| 5,220,414 A | | 6/1993 | Rabii et al. | |
| 5,243,624 A | * | 9/1993 | Paik et al. | ..................... 375/14 |
| 5,535,150 A | * | 7/1996 | Chiang | ................. 364/724.19 |
| 5,594,508 A | * | 1/1997 | Penney | ........................ 348/665 |
| 5,835,630 A | * | 11/1998 | Schweid et al. | ............ 382/173 |

FOREIGN PATENT DOCUMENTS

| EP | 0616475 | 9/1994 |
|---|---|---|
| WO | 9013978 | 11/1990 |

OTHER PUBLICATIONS

Copy of EPO Search Report for 97113484.6, dated Jan. 20, 1998.

* cited by examiner

Primary Examiner—Victor R. Kostak
(74) Attorney, Agent, or Firm—Duane Morris LLP

(57) ABSTRACT

An adaptive filter is disclosed comprising a source (1) for a television signal (f), a delay device (2) for forming delay signals (v0 to v5) from the television signal, a filter combination (3) comprising at least one comb-up device and one comb-down device (3.4, 3.1) for forming filter signals (s1 to s4) from the delay signals, a mixer (5), a decision device (4) for analyzing the delay signals (v0 to v5), and a computing matrix (7) for forming weighting factors (g) for the mixer (5). A manually controllable or data-controllable setting device (8) is coupled to the decision device (4) for changing the mixing behavior in the mixer (5), which is dependent on a predetermined algorithm in the decision device (4) and/or the computing matrix (7).

20 Claims, 2 Drawing Sheets

ADAPTIVE FILTER FOR PROCESSING VIDEO SIGNALS

FIELD OF INVENTION

This invention relates to an adaptive filter for a device for processing television signals, e.g., a television receiver, a video recoder, or a television-capable multimedia device, which serves to separate the interleaved luminance and chrominance components of a composite color signal.

BACKGROUND OF INVENTION

For this separation, filter combinations are increasingly being used which permit a better adaptation to certain image characteristics than single filters. For the filtering, as is well known, brightness and color transitions as well as mosaic structures in the image content are critical. Because of the filter characteristics, this partly results in very disturbing spurious signals which show up in the image as color fringing, "worm tracks", "dot crawl", or moire patterns. The spurious effects produced by the individual filters, e.g., comb, bandpass, or bandstop filters, and their causes are known. Therefore, attempts are being made to achieve disturbance-free separation by combining different filters. Switching directly from one filter to the other is not conducive to this. Soft switching by controlling the individual filter contributions is much better and produces fewer transition effects. In this manner, intermediate states can be set for the filtering using the combining effect of several or all filters; The individual filter contributions are combined into a single output signal using different weighting factors. The determination of the individual weighting factors is controlled by an analysis or decision device which examines the image content in the respective region for critical image structures, with a field or frame storage registering both area-related and temporal image characteristics. Via these analysis values, the filter combination can be adaptively controlled. An example of such an adaptive filter arrangement, which is also suitable for monolithic integration, is described in detail in PCT Patent Application WO 90/13978.

One disadvantage of the prior-art adaptive filters is that the algorithm for controlling the filter contributions is wired in or programmed by the manufacturer. Intervention from outside by the equipment manufacturer or the user is thus nearly impossible, for the program allows only slight modifications to the complicated algorithm, provided one knows where to intervene.

Another disadvantage is that the predetermined algorithm is optimized essentially only for a single operating and image condition and does not take different image sources, receiving conditions, and processing devices into account. For the rest, the algorithm, as a rule, orients itself by the usual test patterns, which convey an optimum impression, but which generally do not look so good in the presence of real television signals, i.e., under subjective viewing conditions.

It is therefore an object of the invention to make it possible to adapt the response of an adaptive filter in the simplest possible manner to different operating conditions and video signals even after the manufacturing process.

BRIEF DESCRIPTION OF THE FIGURES

The invention and further advantageous aspects thereof will now be explained in greater detail with reference to the accompanying drawings, in which.

SUMMARY OF THE INVENTION

Figure 1:
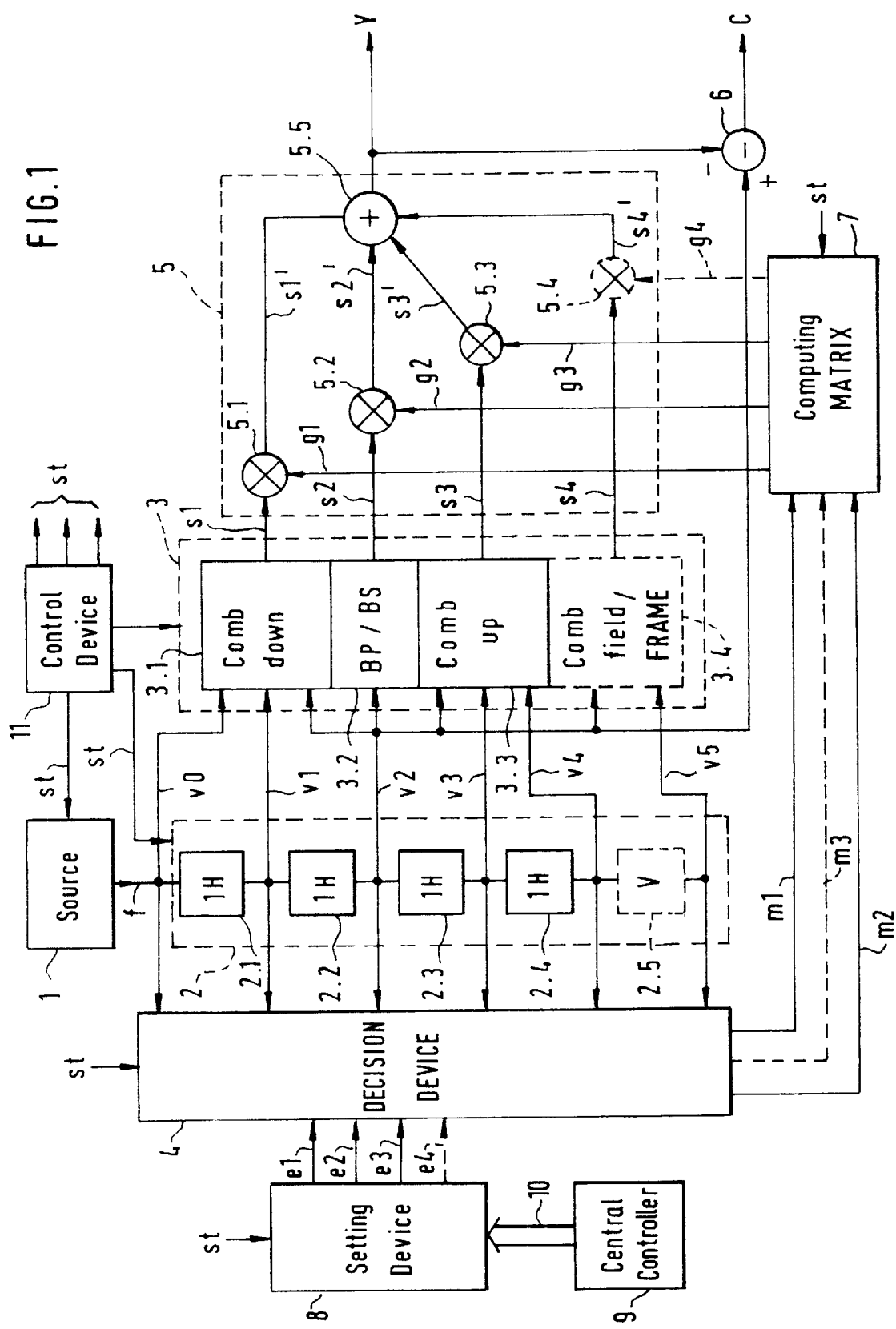
FIG. 1 is a block diagram of an adaptive filter according to the invention.

An adaptive filter having a source for a television signal, a delay device for forming delay signals from the television signal, a filter combination having at least one comb-up device and one comb-down device, for forming filter signals from the delay signals, a mixer coupled to the filter combination at its input end and providing a filtered signal at its output, a decision device for analyzing the delay signals and for forming matrix control values and a computing matrix for transforming the matrix control values into weighting factors for the mixer, wherein a manually controllable or data-controllable setting device is coupled to the decision device for changing the mixing behavior in the mixer, the mixing behavior being dependent on a predetermined algorithm in the decision device or the computing matrix. mixer, the mixing behavior being dependent on a predetermined alogorithm in the decision device or the computing matrix.

DETAILED DESCRIPTION OF THE INVENTION

This object is attained by coupling to the decision device a manually controllable or data-controllable setting device for changing the mixing behavior in the mixer, which is dependent on a predetermined algorithm in the decision device and/or computing matrix.

The invention allows the response of a given filter device to be adapted to the subjective impression. This is accomplished by means of manual controls or via data which are entered, for example, by means of a remote control or a programmable controller. The values settable by means of the manual control are assigned to characteristic image parameters which are also registered by the analysis device. Such image parameters characterize the image quality and image characteristics, such as noise, image structures, and video frequencies, but also may indicate from which sources the signals originate, e.g., from the video recorder. In the simplest case, the setting values represent weighting factors with which the associated image analysis values are increased, reduced, or left unchanged. Advantageously, the characteristic image parameters are direction- and/or time-dependent image gradients, since these image gradients, as mentioned above, are mainly responsible for the spurious response of the individual filters.

Combing, for example, will fail when there are vertical brightness and/or color changes, particularly step changes, in the picture. In that case, switchover from combing to the bandpass or bandstop filter would have to be effected. Using notch filters, narrow frequency ranges, such as the chrominance subcarrier frequency or the associated chrominance components, can be effectively removed from a composite signal.

The coding of the luminance and chrominance information in standard television signals, provided the signal quality is good, permits a simple separation using known combing techniques, which are performed line by line or field by field or frame by frame. If, however, direction- and/or time-dependent gradients are present, the combing becomes critical.

Since artifacts are caused by vertical, horizontal, and diagonal image gradients in particular, the weighting of these characteristic image parameters via the associated setting values in accordance with the invention proves very appropriate. Taking into account the time information or detecting mosaic structures requires a large amount of circuitry. However, the specific evaluation of these image parameters can also be omitted without major disadvantages since, as a rule, these image parameters are not independent of the aforementioned three direction gradients, but are covered by the latter at least in part. To keep the required amount of circuitry small, the diagonal image gradients are formed from the superposition of at least two horizontal image gradients. If there is no change in the image structure in the diagonal direction, the difference of two horizontal image gradients is zero. The term "diagonal" as used herein covers all angles which appreciably deviate from the orthogonal reference directions h, v.

It should be noted that the formation of the image gradients and the associated processing and control circuits can be implemented with both analog and digital circuitry. Analog notch filters which are precisely tuned to the chrominance subcarrier frequency are easy to implement and reliably filter the chrominance subcarrier component out of the applied analog television signal. By high-pass filtering the remaining signal, the horizontal image gradient is then formed. The vertical image gradient is formed by determining the instantaneous signal difference over two or more lines. Suitable analog delay devices are, for example, charge-coupled devices (CCDs).

If digital processing is performed, the composite video signal must be present in digitized form. The image parameters must now be formed from the digitized values, whose position in time is determined by the digitization clock. For the formation of the individual image gradients from the individual sample values, however, the reference phases must be identical. This can be easily achieved if the digitization clock and the chrominance subcarrier are phase-synchronized and their frequencies have an integral relationship to each other. In the above-mentioned WO 90/13978, the system clock frequency, and thus the frequency of the digitization clock, is four times the chrominance subcarrier frequency. In that case, every fourth picture element in a picture line has the same reference phase, so that a horizontal gradient can be formed by simple subtraction. If the digitization frequency is not locked to the chrominance subcarrier, it must be insured in another manner that the reference phases are equal. To accomplish this in the embodiment shown below, an interpolated intermediate value is calculated from the neighboring sample values.

The adaptive control and the adjustable weighting must not change the amplitude of the filtered output signal. This is achieved by means of a mixer in which the different output signals from the individual filters are weighted. Amplitude equality is achieved if the sum of the individual weighting factors is 1. The calculation of the individual control values from the decision device is performed in the computing matrix, which may also be implemented by a resistance network or a table. An exact calculation of the individual weighting components necessitates a division, which is very complicated, particularly in the digital solution. By an approximation, however, the division can be avoided in the analog and digital solutions.

FIG. 1 shows a block diagram of one embodiment of the adaptive filter according to the invention. A source 1 supplies a television signal f to a delay device 2 consisting of a cascade of four delay elements 2.1 to 2.4 which each delay the television signal by one line. The output of the delay cascade may be followed by a delay stage 2.5 which causes a delay by one field or frame with respect to the tap between the stages 2.2, 2.3. The taps of the delay cascade 2 make available the delay signals v0 to v5, which are fed to a filter combination 3 and a decision device 4. The filter combination 3 contains a comb-down filter 3.1, a bandpass/bandstop filter 3.2, and a comb-up filter 3.3, and may include a field or frame comb filter 3.4. The delay signal v2 corresponds to a middle line from which the combing is performed upward or downward. The lines to be combed depend on the respective color television standard; in the PAL system, the distance is two lines, and in the NTSC system, the distance is one line. The field or frame delay V of the delay stage 2.5 is referred to the middle delay signal v2.

The output signals of the filter combination 3 are the filter signals s1 to s4, which are fed to a mixer 5 in which they are weighted and then added. Each of the filter signals is assigned a multiplier 5.1 to 5.4, and the outputs s1' to s4' of these multipliers are combined by means of an adder 5.5 to form the required output signal. In the embodiment shown, this is the luminance signal Y. If, instead of the luminance signal, the chrominance signal C is to be provided at the output, essentially only a few signs of the delay signals have to be changed in the filter combination 3, and the filter 3.2 must be a bandpass filter for the range of the chrominance signals, not a bandstop filter as for the luminance signal Y. It is particularly simple to form the chrominance signal C from the middle delay signal v2 and the luminance signal Y by means of a subtracter 6.

The multipliers 5.1 to 5.4 are controlled by weighting factors g1 to g4, respectively, which are formed in a computing matrix 7. In the computing matrix, a functional relationship is established between matrix control signals m1 to m3 which are formed in the decision device 4 by analyzing the delay signals v0 to v5. As analysis signals, at least one horizontal image gradient Hdiff, one vertical image gradient Vdiff, and one diagonal image gradient Ddiff are formed from the delay signals. For the separate control of the comb-down filter 3.1 and the comb-up filter 3.3, the vertical gradient Vdiff is formed as a lower vertical image gradient Vdiffdn and an upper vertical image gradient Vdiffup, with the gradient calculation being referred to the middle delay signal v2. These two gradients are used to determine whether the image change lies more below or more above the middle line, or whether there is a vertical image change at all.

If the formation of the image gradients in the decision device 4 is limited to the three analysis directions vertical, horizontal, and diagonal, three weighting factors g1, g2, g3 can be uniquely determined with two suitable matrix control values m1, m2 using a three-dimensional computing matrix 7. The first weighting factor g1 is then assigned to the comb-down filter 3.1, the second weighting factor g2 to the bandpass/bandstop filter 3.2, and the third weighting factor g3 to the comb-up filter 3.3. The field/frame comb filter 3.4 does not become active in that case. A suitable matrix control value ml can be formed, for example, via the individual analysis image gradients and setting values e1, e2, e3 as follows:

$$m1 = \frac{e1 \times Vdiffdn - [e2 \times Hdiff - e3 \times Ddiff]}{K + e2 \times Hdiff}$$

where the difference in braces in the numerator is limited to the value 0 for negative differences, and K is a coefficient dependent on the amplitude of the composite color signal f and having a value between 0 and 1.

The second matrix control value m2 is formed in a similar manner, namely by substituting the upper vertical gradient Vdiffup for the lower vertical gradient Vdiffdn in the above equation. With the respective matrix control value m1, m2, the contribution of the bandpass/bandstop filter 3.2 to the filtered output signal is determined The first matrix control signal m1 contains the lower vertical image gradient Vdiffdn, and the second matrix control value m2 the upper vertical image gradient Vdiffup. The three weighting factors g1 to g3 are formed from the two matrix control values m1, m2 in the computing matrix 7 by means of a transformation formula.

In the following, the basic idea behind the above formula for the two matrix control values m1, m2 will be explained. The contribution to noncombed signals is to be determined by the matrix control values m1, m2: if the vertical difference Vdiff is large, the noncombed contribution is to be large as well. If there is a horizontal difference Hdiff, that speaks against the bandpass filter or bandstop filter (which generate noncombed signals) , and this gradient therefore should facilitate the combing (see the negative sign before the braces). If, however, the horizontal image changes are accompanied by diagonal image changes Ddiff, the combing causes particularly annoying disturbances, so that the combing should rather be slightly restricted (see the negative sign before the term with Ddiff). In order that large diagonal gradients in the presence of small horizontal gradients do not augment the combing action as a result of the subtraction, the content of the braces must never become negative but is then clamped to the value zero. At small amplitudes of the composite video signal, it must be assumed that the approximately constant noise amplitude is large compared to the useful signal. Combing would therefore be unfavorable, as the signal-to-noise ratio is further degraded by the subtraction during combing. By the amplitude-dependent coefficient K, the matrix control value m1, m2 is made independent of the respective amplitude, i.e., it is normalized, so to speak. It is apparent that without this normalization, the vertical gradient Vdiff is directly dependent on the amplitude and would thus act on the combing exactly in the wrong direction. The denominator further includes the horizontal image gradient Hdiff as an additive component, which, as in the case of the numerator, is to aid the combing as its value increases.

For the formation of the setting values e1 to e4, FIG. 1 shows schematically a setting device 8 which contains either manual setting means, such as potentiometers, keys, toggle switches, etc., or a device for storing digital data which are fed from a central controller 9 to the setting device 8 over a control bus. The central controller 9 is accessible to the equipment manufacturer, but also to the user of the equipment, e.g., via a keypad or a remote-control device. Finally, FIG. 1 includes a control device 11 which controls the individual stages, including the necessary switching for PAL, NTSC, etc., by means of control signals st.

Figure 2:
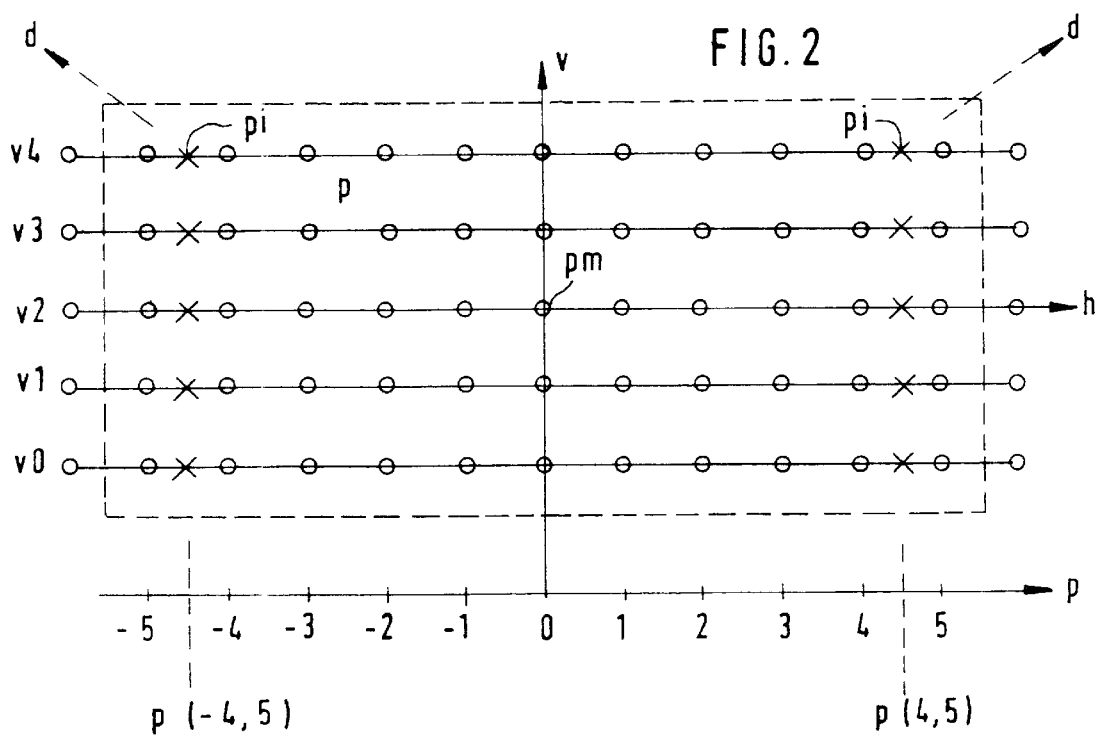
FIG. 2 shows schematically stored picture elements in an orthogonal picture-element matrix if the digitization frequency is not locked to the color carrier.
Figure 3:
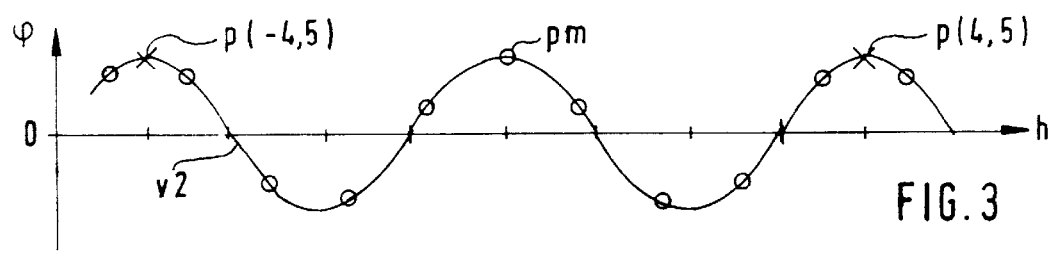
FIG. 3 shows schematically the reference-phase characteristic of a picture line and the associated sampled picture elements.

FIG. 2 shows an orthogonal array of stored picture elements p, which are shown in a horizontal/vertical raster h, v corresponding to the pattern on a television screen. Located at the center is the middle picture element pm, whose signal components are to be separated by the adaptive filter device. As an example, a PAL signal has been assumed, which is digitized at a clock rate of 20.25 MHz. The reference phases of the stored picture elements p are not identical, so that for the subtraction, interpolated picture elements pi must be used at the pixel values p=4.5 and p=−4.5. These interpolated picture elements are shown in FIG. 2 by prostrate crosses. FIG. 3 shows the variation of the reference phase φ in the horizontal direction h for the middle delay signal v2. The sinusoidal waveform of the delay signal v2 shows that linear interpolation is not optimal, but that the sine curve must be approximated by suitable interpolation. The position of the individual picture elements p on the curve is time-dependent on the digitization frequency. The absolute interpolating instant is fixed by the chrominance subcarrier period. The interpolating instant relative to the respective neighboring values, however, is dependent on the digitization frequency.

Figure 4:
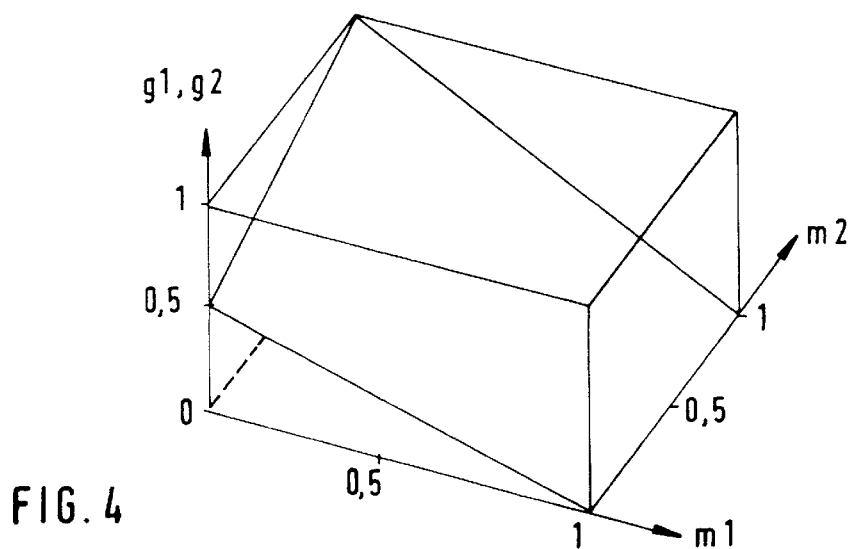
FIG. 4 shows the approximative assignment of a weighting factor to two matrix control values in a three-dimensional representation.

FIG. 4 shows the approximation of the transformation in the computing matrix 7 in a three-dimensional representation. The function which determines the combing contribution from the first and second matrix control values m1, m2 looks as follows:

$$g1, g3 = \frac{(1-m1)}{(1-m1)+(1-m2)+m1\_m2}$$

The function is symmetrical with respect to the matrix control values m1, m2, so that the weighting factors g1, g3 for the lower and upper combing are obtained simply by interchanging these values. The weighting factor g2 for the standard filter, i.e., the filter 3.2, is obtained according to the above transformation equation by multiplying the first and second matrix control values m1, m2. Since the transformation equation includes the formation of a quotient, it is replaced by an approximation function, which is shown schematically in FIG. 4. A good example of an approximation function is shown by the following equation for the weighting factors g1 and g3, which contains only linear relationship:

$$g1, g3 = \frac{1-m1+m2-m1\_m2}{2}$$

If the weighting factors g1, g3 for the two comb filters 3.1, 3.3 are already fixed or have already been calculated, the still unknown weighting factor g2 for the bandpass/bandstop filter 3.2 can be determined simply by interchanging the matrix control values m1, m2 and the weighting factors g1, g3. The choice of the two input variables for determining the unknown third quantity, as in the case of the above transformation equation, depends only on which of the three quantities are already available for further calculation. In the embodiment of FIG. 1, these are the two "weighting factors" (=matrix control values) m1, m2 which are given for independent, but actually nonexistent bandpass/bandstop filters, with the lower and upper vertical image gradients Vdiffdn and Vdiffup entering into the weighting factors m1 and m2, respectively. From the values m1, m2, the lower combing factor (=weighting factor g1) and the upper combing factor (=weighting factor g3) are formed, taking into account the lower vertical image gradient Vdiffdn and the upper vertical image gradient Vdiffup, respectively. From the two weighting factors g1, g3, the still unknown weighting factor g2 for the actually present bandpass/bandstop filter 3.2 is formed.

It should be noted that it is also possible to use other transformation functions, including nonlinear ones. In that case, however, a mathematical interchange of the independent and dependent variables is no longer possible. For the actual determination of the weighting factors, however, the transformation functions are present in wired-in or program form, so that the mathematical approach, which only serves to explain the principle of the transformation, is of no significance for the actual processing.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

I claim:

1. An adaptive filter comprising
   a source for a television signal (f),
   a delay device for forming delay signals (v0 to v5) from the television signal,
   a filter combination comprising at least one comb-up device and one comb-down device, for forming filter signals (s1 to s4) from the delay signals,
   a mixer coupled to the filter combination at its input end and providing a filtered signal (Y) at its output,
   a decision device for analyzing the delay signals (v0 to v5) and for forming matrix control values (m1, m2, m3), and
   a computing matrix for transforming the matrix control values into weighting factors (g1 to g4) for the mixer,
   wherein a manually controllable or data-controllable setting device is coupled to the decision device for changing the mixing behavior in the mixer, said mixing behavior being dependent on a predetermined algorithm in the decision device or the computing matrix.

2. The adaptive filter as claimed in claim 1, wherein the setting device supplies the decision device with setting values (e1 to e4) each of which is assigned to a characteristic image parameter and weights said image parameter for the further processing.

3. The adaptive filter as claimed in claim 2, wherein the image parameters correspond to direction or time-dependent image gradients.

4. The adaptive filter as claimed in claim 3, wherein the image gradients are assigned to at least one horizontal, one vertical, and one diagonal image direction (h, v, d).

5. The adaptive filer of claim 1, wherein the decision device determines analysis image gradients from the delay signals (v0 to v5).

6. The adaptive filter as claimed in claim 5, wherein the analysis image gradients (Hdiff, Vdiffdn, Vdiffup, Ddiff) are determined at least in the horizontal, vertical, and diagonal image directions (h, v, d).

7. The adaptive filter as claimed in claim 6, wherein the formation of the analysis image gradient (Ddiff) in the diagonal direction (d), the difference of at least two horizontal analysis image gradient (Hdiff) is formed.

8. The adaptive filter of claim 1, wherein the source generates a digitized television signal (f), and that for the formation of the analysis image gradients, the picture elements (p, pm) of a stored picture-element matrix are used in the decision device.

9. The adaptive filter of claim 8, wherein the picture-element matrix comprises the picture elements (p, pm) of five neighboring picture lines, with the stored regions of the picture elements in the horizontal (h) and vertical (v) directions each being symmetrical about a central picture element (pm).

10. The adaptive filter as claimed in claim 9, wherein for the formation of the analysis image gradients, only the picture elements (p, pm) with the same reference phase are used or that prior to the storage of the picture elements (p, pm), their spurious component is suppressed by means of a filter or a quadrature demodulator.

11. The adaptive filter as claimed in claim 10, wherein the formation of the analysis image gradients, use is also made of interpolated picture elements (pi) which are calculated from the stored picture elements (p, pm) by interpolation, with the required equal reference phase relation being established by suitable choice of the interpolating instant.

12. The adaptive filter of claim 1, wherein the weighting factors (g1, g2, g3) are determined in the computer matrix by means of an approximation formula.

13. A filtering device comprising:
    a source for generating a signal;
    a delay device coupled to said source for generating a plurality of delayed signals from said generated signal, each of said plurality of delayed signals being associated with a different delay with respect to said generated signal;
    a filter device coupled to said delay device for generating a plurality of filtered signals, each of said plurality of filtered signals associated with a different filter type;
    a decision device coupled to said delay device for generating a plurality of control signals dependent upon said plurality of delayed signals; and,
    a combining stage coupled to said filter device and said decision device, said combining stage for weighting and combining said plurality of filtered signals to generate a first output signal therefrom, wherein said weighting of each of said plurality of filtered signals is responsively adapted to said plurality of control signals.

14. The device of claim 13, wherein said delay device comprises a cascade of a plurality of delay elements each of which delay said generated signal to produce one of said plurality of delayed signals.

15. The device of claim 13 further comprising means for generating a second output signal from said first output signal and at least one of said plurality of delayed signals.

16. The device of claim 15, wherein said generated signal is a television signal, said first output signal is a luminance signal and said second output signal is a chrominance signal.

17. The device of claim 13, further comprising a setting device coupled to said decision device for generating a plurality of setting values, each of said plurality of setting values being dependent upon an image gradient, respectively, and said plurality of control signals being dependent upon said plurality of setting values.

18. The device of claim 17, further comprising a central controller coupled to said setting device for controlling said setting device.

19. The device of claim 13, further comprising a computing matrix coupled between said decision device and said combining stage for generating a weighting signal for each of said plurality of filtered signals, wherein said weighting of said plurality of signals in dependent upon said plurality of weighting signals.

20. A method for adaptively filtering a signal comprising the steps of:

generating a plurality of delayed signals from said signal, each of said plurality of delayed signals being associated with a different delay with respect to said signal;

generating a plurality of filtered signals by filtering each of said plurality of delayed signals respectively;

determining at least one gradient of said signal;

adaptively weighting each of said plurality of filtered signals individually, said adaptive weighting being responsive to said at least one signal gradient; and, combining said plurality of adaptively weighted filter/ed signals to generate an output signal from said adaptively weighted filtered signals.

* * * * *